United States Patent [19]

Bonnefoy et al.

[11] Patent Number: 4,822,170

[45] Date of Patent: Apr. 18, 1989

[54] SENSOR FOR THE CONTACTLESS LINEAR MEASUREMENT OF THE DISTANCE OF A TARGET BY BACKSCATTERED RADIATION

[75] Inventors: Jean-Louis Bonnefoy; Jean-Paul Prulhiere, both of Bordeaux, France

[73] Assignee: Commissariat A l'Energie Atomique, Paris, France

[21] Appl. No.: 42,237

[22] Filed: Apr. 24, 1987

[30] Foreign Application Priority Data

Apr. 30, 1986 [FR] France .................................. 8606265

[51] Int. Cl.$^4$ ............................................. G01B 11/14
[52] U.S. Cl. .................................................... 356/375
[58] Field of Search ................. 356/375, 373; 250/227

[56] References Cited

U.S. PATENT DOCUMENTS

| | | | |
|---|---|---|---|
| 3,327,584 | 6/1967 | Kissinger | 356/375 |
| 3,771,873 | 11/1973 | Tourret | 356/4 |
| 3,784,309 | 1/1974 | Brelot et al. | 250/227 X |
| 4,484,069 | 11/1984 | Brenholdt | 250/201 |

FOREIGN PATENT DOCUMENTS

| | | |
|---|---|---|
| 2399000 | 7/1977 | France . |
| 2508160 | 6/1981 | France . |
| 2554244 | 10/1983 | France . |
| 0148393 | 12/1978 | Japan .................................. 356/375 |
| 0096203 | 6/1982 | Japan .................................. 356/373 |
| 0044806 | 11/1985 | Japan .................................. 356/375 |
| 2069286 | 11/1980 | United Kingdom . |

Primary Examiner—F. L. Evans
Attorney, Agent, or Firm—Kerkam, Stowell, Kondracki & Clarke

[57] ABSTRACT

Sensor for the contactfree linear measurement by backscattered radiation of the distance (d) between the sensor and a possibly moving target, comprising a light emitter supplying to the target a light beam, means for determining the distance (d) by referring to curve $I=f(d)$ translating the relationship between distance (d) and the backscattered intensity, wherein the means for analysing the intensity (I) of the backscattered light are constituted by two adjacent, parallel receivers which are spaced from the emitter and from one another, so that the second parts of the graphs of their law $I_1=f_1(d)$ and $I_2=f_2(d)$ are outside one another.

4 Claims, 2 Drawing Sheets

SENSOR FOR THE CONTACTLESS LINEAR MEASUREMENT OF THE DISTANCE OF A TARGET BY BACKSCATTERED RADIATION

BACKGROUND OF THE INVENTION

The present invention relates to a sensor for the contactless linear measurement by backscattered radiation of the distance separating the sensor from an optionally moving target.

The prior art already discloses sensors for the linear measurement of such a distance, such as those e.g. described in the article entitled "Use of Optical Proximity Sensors in Industrial Robotics", pp 47 ff of the journal "Le Nouvel Automatisme", May/June 1980 or in French patent application No. 83 17 183 of 27.10.1983 entitled "Backscattered radiation proximeter usable in robotic telemanipulation and associated processing system", now French Pat. No. 2554244.

Most devices of this type operate by using sensors formed from a light radiation transmitter or emitter and a receiver, separated by a distance d from one another, whereby the target whose distance d is to be measured is used for reflecting a light beam from the emitter and which is reflected towards the receiver.

A known device of this type is very diagrammatically shown in FIG. 1, where it is possible to see a light emitter E and a receiver R spaced by $\delta$ and the surface S of a target moving with respect to the sensor, the distance between surface S and the sensor being equal to d. A light beam emitted by emitter E in the direction of point M of surface S is assumed to form an angle $\theta$ with the normal MN to the surface S at point M. It is reflected in accordance with the previleged direction $\theta$ towards receiver R. There is a certain dispersion of the reflected light, but the maximum intensity of the backscattered beam is, according to the laws of optics, in angular direction $\theta$ symmetrical of the incidence direction with respect to the normal MN.

The device of FIG. 1 implies that emitter E and receiver R are inclined by an angle $\theta$ with respect to the normal to the support.

On studying within a system of this type, the light intensity I received by receiver R from the sensor as a function of the distance d separating the sensor from the target surface S, a curve 1 is obtained having the general configuration shown in FIG. 2. Curve 1, starting from zero, develops to a maximum for distance $d=d_0$ and then decreases asymptotically to a zero value when distance d tends towards infinity. In other words, for a given geometrical constitution of the assembly of FIG. 1, there is a distance $d_0$ from the sensor to the target for which the intensity of the signal received by receiver R is maximum. On modifying the physical properties of surface S of the target, it is possible to obtain other curves, such as e.g. curve 2, whereof the maximum is located at a lower amplitude, but all the maxima of the different curves are for the same value $d_0$ of distance d. Hereinafter it will be noted that it is possible to divide the path of graphs 1 and 2 representing the laws $I=F(d)$ into three portions, namely a first portion $d=0$ to $d=d_1$ in which the graph representing the function $I=F(d)$ is substantially a straight line and consequently law $I=F(d)$ is linear; a second portion extending from value $d_1$ to value $d_2$ of d, i.e. in the vicinity of the maximum M of each of the graphs 1 and 2, where the preceding curves are substantially quadratic, i.e. they could be represented by a parabolic development, whose mathematical expression would be close to $I=K_1+K_2d+K_3d^2$; finally between value $d=d_2$ and infinity, a third part where the function $I=F(d)$ is substantially decreasing parabolic and can be mathematically represented in simplified form by a function of type $I=k/\sqrt{d}$.

In other hitherto distance measuring sensors or optical proximeters, use is solely made of the first linear part of the aforementioned graphs, i.e. that separating the zero distance from distance $d=d_1$, so as to be able to have a sensor expressing the result of the sought measurement by an analog magnitude substantially proportional to the distance which it is wished to measure. Such sensors function correctly, but it is clear that the limitation imposed in this case for the measuring range with respect to the graphs of FIG. 2 constitutes a serious limitation to the range of application of such equipment, particularly for values exceeding the distance d.

The present invention relates to a sensor for the contactfree linear measurement by backscattered radiation of the distance d separating the sensor from a possibly moving target and which permits the use both of the first and third parts of the graphs of FIG. 2. In other words, this sensor operates by solely removing the parabolic zone located in the case of the graphs of FIG. 2 in the immediate vicinity of the maximum M thereof. Thus, this leads to a better definition and a greater accuracy of the sought result.

SUMMARY OF THE INVENTION

Thus, the invention specifically relates to said linear measuring sensor having the light emitter returning to the target a light beam under an incidence $\theta$, means for analysing the intensity I of the part of said light backscattered by the target in the privileged reflection direction forming with the normal to the target the reflection angle $\theta$, means for determining the distance d on referring to curve $I=F(d)$ translating the relationship, for the sensor used, between the sought distance d and the backscattered intensity effectively measured in direction $\theta$, said curve generally having in known manner a first substantially linear part, a second substantially quadratic part in the vicinity of its maximum and a third substantially decreasing parabolic part, wherein the means for analysing the intensity I of the backscattered light are constituted by two adjacent, parallel receivers which are spaced from the emitter and from one another, in such a way that the second parts of the graphs of their law $I_1=f_1(d)$ and $I_2=f_2(d)$ are outside one another and that a random distance d can always be read on at least one of the first and third parts of the graphs representing laws $I_1=f_1(d)$ and $I_2=f_2(d)$, said third portions being used following linearization by any known electronic means.

The essential characteristic of the sensor according to the invention is that it simultaneously uses two adjacent, parallel receivers for analysing and measuring the intensity I of the light backscattered by the target surface which it is wished to investigate. Thus, experience has shown that it was possible, by appropriately choosing the geometrical characteristics of the sensor (distance between emitter and receivers, angle of inclination of emitter and receivers with respect to the normal to the surface to be investigated, distance between two receivers) to obtain graphs representing laws $I_1=f(d)$ and $I_2=f_2(d)$ with the second part thereof, having a substantially quadratic shape in the vicinity of the maximum thereof, which are outside one another.

No matter what the distance d of the target which it is wished to investigate, under these conditions it is possible to eliminate the two quadratic zones about the maximum of each of the two curves, whilst still having the possibility for any value of distance d to work on the rectilinear or parabolic part (i.e. the first or third parts) of one of the preceding graphs.

On working on the rising rectilinear part of one of the preceding graphs, the reading of d is effectively linear as a function of the analog voltage supplied by the receiver under the influence of the light intensity which it receives. On working on the third part of one of the two curves, i.e. the parabolic part, it is merely necessary to adapt a correction of form $k/\sqrt{V}$ to linearize the indication of the receiver, whereby in this formula k is a constant and V designates the voltage collected at the receiver output.

Thus, in all possible cases, the use of two receivers and through working with the aid of two separate graphs, whereof each corresponds to one of the receivers, it is possible to obtain at the output an analog voltage directly proportional to the distance d to be measured.

According to another interesting feature of the present invention, the measuring sensor is formed in such a way that the part of the graph $I_2$ extending from the origin thereof up to its intersection point with graph $I_1$ is still completely included in the first substantially linear part of said graph $I_2$.

In the embodiment of the sensor according to the invention, it is then possible to measure the distance d on the upward linear part of receiver 2 up to the intersection of the two preceding graphs and on the third parabolic falling part of graph 1 for distances exceeding that corresponding to the intersection of the two preceding graphs. This will be further defined and made clear during the following description relative to the drawings.

Finally, it is obvious that for increasing the accuracy of the measurements obtained with the aid of the linear sensor according to the invention, it is of interest, whenever this is possible, to combine the information received by the two receivers, e.g. by forming the mean.

The measuring means used at the output of the two light receivers utilize the analog voltages $V_1$ and $V_2$ which they generate in order to obtain information proportional to the distance d to be measured. A simple calibration of the apparatus makes it possible to obtain the absolute value of said measurement.

To this end, various automatic electronic circuits can be envisaged, whereof some are simpler and more interesting than others. Thus, according to a particularly interesting embodiment of the measuring sensor according to the invention, the latter is equipped with electronic means for comparing the analog voltages $V_1$ and $V_2$ supplied by the sensors receiving the backscattered intensities $I_1$ and $I_2$ and analog multiplexing means controlled by said comparison means and supplying at the output, as a function of the value of the ratio $V_1/V_2$ with respect to the unit, either a signal equal to $1/\sqrt{V}$ in the hypothesis that $V_1/V_2 < 1$, or a signal equal to $V_2$ if $V_1/V_2 \geq 1$, i.e. in all cases where an analog signal proportional to the value of the sought distance d.

As in the prior art, it is of interest for eliminating certain optical interference to work on time-chopped light in the form of flashes, which makes it possible to have high instantaneous light power levels on emission and thus reduce, in relative values, the significance of any optical interfering signal.

This is also known from French patent application 83 17 183 and no further details will be given on this way of using the emitted, backscattered light energy received in the sensor.

BRIEF DESCRIPTION OF THE DRAWINGS

FIG. 1 shows a prior art device, whereas

Figure 3:
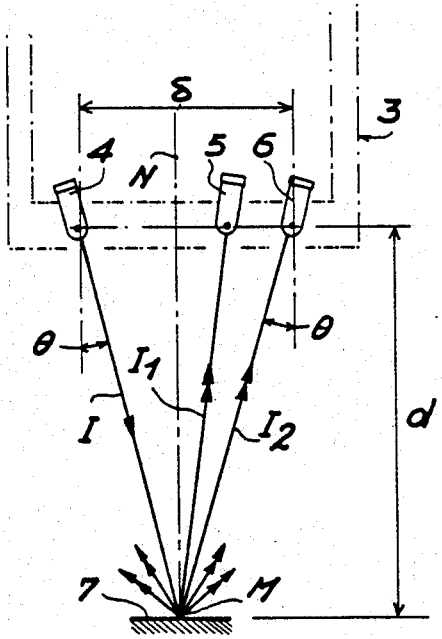

The invention is described in greater detail hereinafter relative to non-limitative embodiments and the attached FIGS. 3 to 5, wherein show:

FIG. 3, a basic diagram of the general constitution of the sensor according to the invention.

Figure 4:
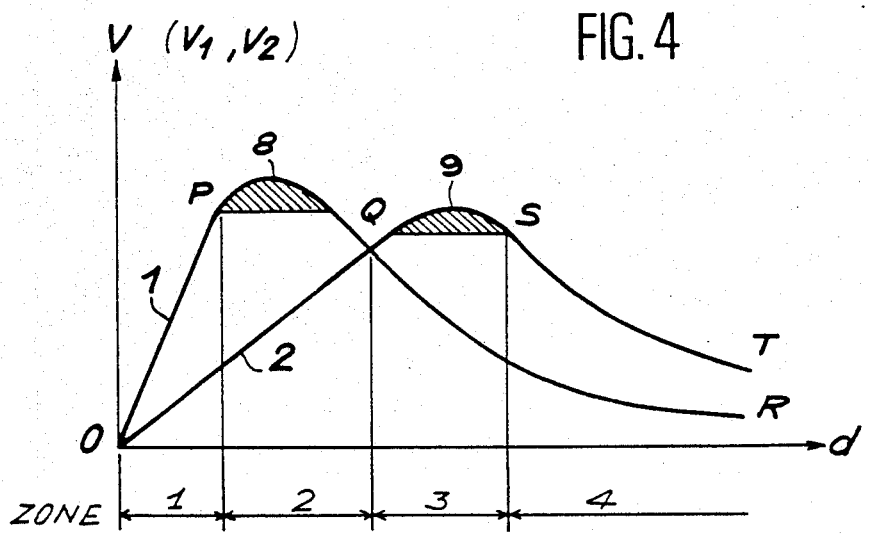

FIG. 4, a diagram showing in a preferred embodiment the reciprocal arrangement of the two graphs $I_1$ and $I_2$.

Figure 5:
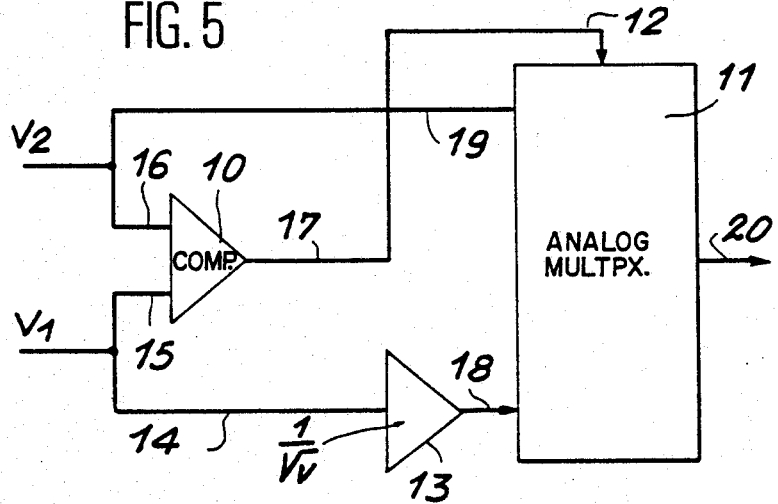

FIG. 5 shows a possible embodiment of the electronic diagram for reading analog information supplied by the two receivers of the sensor.

DETAILED DESCRIPTION

FIG. 3 shows, mounted on a frame 3, the light flash emitter 4, e.g. constituted by a light-emitting diode, as well as the two receivers 5 and 6, e.g. constituted by phototransistors. With respect to the common normal MN to target 7 and frame 3, emitters and receivers 4, 5 and 6 are inclined by an angle $\theta$ in the direction of target 7. The distance between emitter 4 and the two receivers 5, 6 is equal to $\delta$, the distance between the two receivers 5, 6, deliberately greatly exaggerated in FIG. 3 to facilitate understanding, is in reality only max a few centimeters, whereas the distance $\delta$ can be 20 or 30 cm. The distance between frame 3 and target 7 is equal to d, so as to enable the inventive sensor to measure accurately. Paths indicated in continuous lines and arrows in FIG. 3 show on the one hand the main path of the light intensity I emitted by emitter 4 in the direction of point M of target 7 and the intensities $I_1$ and $I_2$ backscattered by said same target 7 in the direction of phototransistors 5, 6.

On referring to FIG. 4, the latter shows on the ordinate the analog voltage V emitted by each of the phototransistors 5, 6 under the effect of the impact of the intensities $I_1$ and $I_2$ from target 7. On the abscissa is shown the value d of the sought distance between support 3 and target 7.

FIG. 4 shows the two graphs 1, 2, each representing the voltage V respectively generated by phototransistors 5 for graph and 6 for graph 2. As explained hereinafter, without inventive activity it is possible to choose the geometrical dimension $\delta$, as well as the distance between receivers 5 and 6, as well as the angle $\theta$, so that the two graphs 1 and 2 are in the reciprocal arrangement of FIG. 3, i.e. their two parabolic zones 8, 9 located in the vicinity of their apex are outside one another in the plane V, d. In this way, it is possible to eliminate the corresponding hatched portion of the graphs and, for reading the informations of receivers 5, 6, to merely use portions OP and QR of graph 1 and portion OQ and ST of graph 2 as shown in FIG. 3. Q represents the intersection point of graphs 1 and 2, which is outside the two parabolic zones 8, 9 eliminated according to the invention.

The reciprocal arrangement of the two graphs 1, 2 of FIG. 4 in the manner explained makes it possible to define four zones designated in FIG. 4 by the terms zone 1, zone 2, zone 3 and zone 4.

There are several possible methods for reading the results supplied by the sensor. If the value of the distance d is in zone 1, it is e.g. possible to form the mean between the voltage readings $V_1$ and $V_2$ respectively given by receivers 5, 6 and graphs 1, 2. If the value of the distance d to be measured is located in zone 2, FIG. 3 makes it clear that it is only then possible to use voltage $V_2$ (graph 2) supplied by receiver 6. If the value of the distance d to be determined is in zone 3, use will then be made of signal $V_1$ (graph 1) supplied by receiver 4, after subjecting it to a linearization, i.e. a division by the factor $K/\sqrt{V}$. Finally, if the sought value of d is in zone 4, it is either possible to work on one of the voltages $V_1$ or $V_2$ supplied by receivers 5, 6 following the linearization thereof, or to use the two preceding results, from which the mean is formed.

Figure 1:
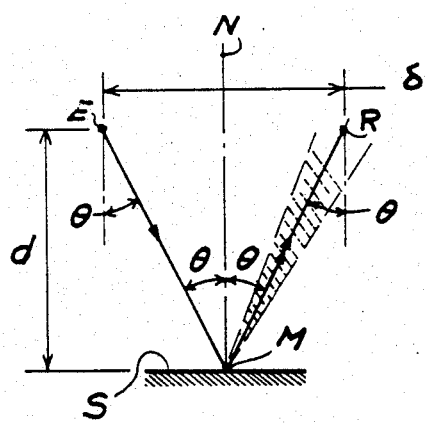
Figure 2:
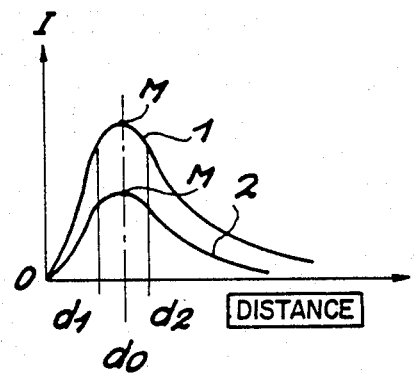
FIG. 2 shows curves which may be generated by the device.

Thus, according to the invention, it is possible to simultaneously use two optical receivers 5, 6, whereof the graphs 1, 2 are arranged in accordance with FIG. 4, which makes it possible to considerably extend, particularly towards high distances d, the range of application of the prior art optical proximeters which, as explained relative to FIG. 1, only envisage the use of the rising rectilinear part of each graph and thus involved a serious limitation of the values of d which can be measured to the benefit of short distances.

On referring to FIG. 5, a description will now be given of one of the preferred circuits used for obtaining a direct reading of the value of the sought distance d as a function of the output voltages $V_1$ and $V_2$ of receivers 5, 6.

The diagram of FIG. 5 essentially comprises a comparator 10 and an analog multiplexer 11 controlled by the output of comparator 10 across a line 12, as well as a linearization circuit 13 converting a signal V into a signal $1/\sqrt{V}$ and receiving a voltage $V_1$ by line 14. Comparator 10 has two inputs 15, 16 respectively receiving voltages $V_1$ and $V_2$ and an output 7 supplying by line 12 the control of analog multiplexer 11. The latter has two inputs 18, 19. Input 18 receives the output signal from linearization system 13 and input 19 directly receives voltage $V_2$ from light receiver 6. At the output 20 of analog multiplexer 11 there is an analog signal which, in all circumstances, is proportional to the distance d to be measured between support 3 and the sensor and target 7.

Thus, comparator 10 is regulated in such a way that it supplies a zero signal at its output 17 if voltage $V_1$ is below voltage $V_2$ and a signal=1 if voltage $V_1$ is equal to or greater than voltage $V_2$.

If the output signal at 17 of comparator 10 is =1, this means that voltage $V_1$ is higher than voltage $V_2$ and that 1 is consequently in one of the zones 1 and 2 of FIG. 4. At this instant, the analog multiplexer 11 is controlled by line 12 to permit the exit at 20 of voltage $V_2$ on which the measurement is directly performed, because this is the linear part of graph 2.

However, if the signal is zero at output 17 of comparator 10, this means that voltage $V_1$ is smaller than voltage $V_2$ and that 1 is then in one of the zones 3 and 4 of FIG. 4. At this instant, the control line 12 of analog multiplexer 11 ensures that the latter emits at its output 20 the signal present on its input 18, i.e. in the present case a signal proportional to $1/\sqrt{V_1}$. This signal corresponds to the falling parabolic part of curve 1 of FIG. 4.

Thus the electronic diagram of FIG. 5 makes it possible to automatically obtain at output 20 of analog multiplexer 11, an analog signal which is in all cases proportional to the distance d which it is wished to measure.

What is claimed is:

1. A sensor for the contactless linear measurement by backscattered radiation of the distance (d) between a sensor and a target comprising a light emitter applying a light beam to the target at a non-zero incidence angle relative to a normal to the target, first and second light receivers spaced from the light emitter, each light receiver operable to receive light reflected from the light beam striking the target with an intensity curve $I=F(d)$ having a first substantially linear part, a second substantially quadratic part in the vicinity of a maximum intensity corresponding to a privileged reflection direction forming a reflection angle relative to said normal with said reflection angle being equal to said incidence angle, and a third substantially decreasing parabolic part, and wherein the second substantially quadratic parts of the intensity curves are outside one another such that a random distance can always be read on at least one of the first and third parts of the intensity curves, and further comprising a circuit connected to receive first and second signals respectively from said first and second receivers, each of said first and second signals being proportional to the intensity of light received by the corresponding one of said first and second receivers, said circuit supplying an output signal proportional to the value of the distance, said output signal derived only from the first and third parts of the intensity curves.

2. The sensor of claim 1 wherein the distance between the light emitter and the first and second receivers are relatively large compared to the distance between the first and second receivers.

3. The sensor of claim 1 wherein said circuit includes electronic means for comparing analog voltages $V_1$ and $V_2$ supplied respectively by the first and second light receivers, and analog multiplexing means controlled by said comparison means and having an output, said output of said analog multiplexing means being dependent upon the ratio $V_1/V_2$ and being an analog signal proportional to the distance.

4. The sensor of claim 3 wherein said output of said analog multiplexing means is the output signal of said circuit and is equal to $1/\sqrt{V_1}$, if said ratio is less than 1 and is equal to $V_2$ if said ratio is greater than or equal to 1.

* * * * *